US006954777B1

(12) United States Patent
Fields et al.

(10) Patent No.: US 6,954,777 B1
(45) Date of Patent: Oct. 11, 2005

(54) METHOD FOR EXTENDING CAPABILITIES OF AN ARBITRARY WEB SERVER

(75) Inventors: Duane Kimbell Fields, Austin, TX (US); Sebastian Daniel Hassinger, Blanco, TX (US); Mark Andrew Kolb, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/363,949

(22) Filed: Jul. 29, 1999

(51) Int. Cl.⁷ .......................................... G06F 15/16
(52) U.S. Cl. ...................... 709/203; 709/217; 709/219; 709/225; 709/229; 709/245
(58) Field of Search ........................ 709/203, 217–219, 709/225–226, 229, 245; 713/185, 200–202

(56) References Cited

U.S. PATENT DOCUMENTS

| | | | | |
|---|---|---|---|---|
| 5,742,768 A | * | 4/1998 | Gennaro et al. ................... 1/1 |
| 5,787,254 A | * | 7/1998 | Maddalozzo et al. .... 707/501.1 |
| 5,809,145 A | * | 9/1998 | Slik et al. ...................... 705/52 |
| 5,825,877 A | * | 10/1998 | Dan et al. ...................... 705/54 |
| 5,864,850 A | * | 1/1999 | Nordman ...................... 707/10 |
| 5,867,651 A | * | 2/1999 | Dan et al. .................... 709/203 |
| 5,870,544 A | * | 2/1999 | Curtis ......................... 709/229 |
| 5,870,550 A | * | 2/1999 | Wesinger et al. ............. 707/10 |
| 5,875,296 A | * | 2/1999 | Shi et al. ..................... 713/202 |
| 5,924,116 A | * | 7/1999 | Aggarwal et al. .......... 711/122 |
| 5,944,781 A | * | 8/1999 | Murray ........................ 709/202 |
| 6,006,260 A | * | 12/1999 | Barrick et al. .............. 709/202 |
| 6,192,415 B1 | * | 2/2001 | Haverstock et al. ........ 707/513 |
| 6,412,008 B1 | * | 6/2002 | Fields et al. ................ 709/228 |
| 6,591,305 B2 | * | 7/2003 | Densmore ................... 709/245 |
| 6,766,454 B1 | * | 7/2004 | Riggins ....................... 713/185 |

FOREIGN PATENT DOCUMENTS

| | | | |
|---|---|---|---|
| JP | 105388 | * | 4/1998 |
| WO | 0810524 A1 | * | 12/1997 |
| WO | 0827075 A2 | * | 3/1998 |
| WO | 0831409 A2 | * | 3/1998 |
| WO | 0887750 A2 | * | 12/1998 |

OTHER PUBLICATIONS

IBM Technical Disclosure Bulletin: "Method To Transform X Window Extension Protocols For Distribution To Mutilple X Servers In Conferencing", vol. 41, No. 01, Jan. 1998; pp. 723-726.*

IBM Research Disclosure: "System For Service Level Identification In A Client/Server WWW/Java Environment", Aug. 1998, pp. 1149-1150.*

* cited by examiner

*Primary Examiner*—Ario Etienne
*Assistant Examiner*—LaShonda Jacobs
(74) *Attorney, Agent, or Firm*—Duke W. Yee; Jeffrey S. LaBaw; Stephen R. Tkacs

(57) ABSTRACT

A method for extending the capabilities of an arbitrary web server operating in a client-server environment (e.g., the Internet). When a client makes a request to the web server, the request may include an address for a code module needed to service the request. If the code module is not available at the web server, the web server uses the address to request the code module from another location. The code module is then served to the web server and installed. The web server then responds to the original client request using the installed code module. In an alternative embodiment, the code module is uploaded to the target server from the client.

7 Claims, 4 Drawing Sheets

METHOD FOR EXTENDING CAPABILITIES OF AN ARBITRARY WEB SERVER

BACKGROUND OF THE INVENTION

1. Technical Field

This invention relates generally to information retrieval in a computer network. More particularly, the invention relates to a method and computer program product for extending the capabilities of an arbitrary web server in the network.

2. Description of the Related Art

The World Wide Web is the Internet's multimedia information retrieval system. In the Web environment, client machines effect transactions to Web servers using the Hypertext Transfer Protocol (HTTP), which is a known application protocol providing users access to files (e.g., text, graphics, images, sound, video, etc.) using a standard page description language known as Hypertext Markup Language (HTML). HTML provides basic document formatting and allows the developer to specify "links" to other servers and files. In the Internet paradigm, a network path to a server is identified by a so-called Uniform Resource Locator (URL) having a special syntax for defining a network connection. Use of an HTML-compatible browser (e.g., Netscape Navigator or Microsoft Internet Explorer) at a client machine involves specification of a link via the URL. In response, the client makes a request to the server identified in the link and, in return, receives in return a document or other object formatted according to HTML. A collection of documents supported on a Web server is sometimes referred to as a Web site.

Recently, the computer industry has sought to add computer processing and communications capabilities to devices other than what would normally be considered a traditional computer. Such devices are quite varied and include, for example, personal digital assistants (PDAs), business organizers (e.g., IBM® WorkPad®, the 3Com® PalmPilot®, and the like), smartphones, cellular phones, desktop screen phones, in-vehicle devices, vending machines, kiosks, vehicle traffic lights, parking meters, computer peripherals (such as printers, fax machines, and the like), other handheld devices, and the like. For convenience, these devices, as a class, are sometimes referred to as "pervasive computing" clients as they are devices that are designed to be connected to servers in a computer network and used for computing purposes regardless of their location.

Arbitrary web servers in a computer network, however, often cannot interoperate with pervasive computing clients. In particular, a given client may require a specific action be taken for successful delivery or display of given content, and such action may not be recognized by the web server that receives the client request. Indeed, in many cases, the web server may not even have the capability of recognizing the client device that initiates the request.

Thus, there is a need in the art to enable an arbitrary web server in a computer network to respond to a given client request even if the server does not recognize the client or otherwise have the capability of responding to the request. The present invention solves this problem.

BRIEF SUMMARY OF THE INVENTION

The present invention is a method for extending the capabilities of an arbitrary web server operating in a client-server environment (e.g., the Internet). According to one embodiment of the invention, when a client makes a request to the web server, the request may include an address for a code module needed to service the request. If the code module is not available at the web server, e.g., because the module is not supported or is unavailable, the web server uses the address to request the code module from another location. The code module is then served to the web server and installed. The web server then responds to the original client request using the installed code module.

The inventive technique enables the web server to add functionality on an as-needed basis. In this way, new capabilities are added to the server without the need for software to be manually updated and installed at the web server platform, and without the server necessarily having to fully understand the exact behavior required to service the client request.

In accordance with a preferred embodiment, when a client makes a request to a target server for a piece of content, the request preferably includes one or more request headers having the unique identifier(s) for the module(s) required by the target server to process the request. The URL(s) from which the module(s) can be downloaded are preferably also included. If the target server has the module(s), the target server applies them sequentially to the content and delivers the resulting data back to the client. If, however, the target server does not possess one or more of the module(s) required, the target server uses the URL(s) provided by the client to contact one or more other servers as needed that publish that specific modules that the target server lacks. The other servers, sometimes referred to as "publishing" servers, then responds with module(s) required. The target server installs the module(s) in an accessible location, uses the module(s) as necessary to process the data, and returns the requested information back to the client.

Preferably, code modules conform to a specific transformation application programming interface (API) so that application developers may write code modules that perform given functions. Any code module that conforms to the transformation API will then be useful in extending the capabilities of the web server irrespective of whether the server fully understands the behavior of the module.

If desired, a code module may be signed, e.g., with a digital key, for verification purposes when the module is served from a given publication server. The target server then first verifies the authenticity of the code module prior to installing and running the module on the local platform. This prevents misuse of the code module deployment scheme.

In an illustrative example, the client is a pervasive computing client that has a proprietary image display format. When the client makes a request for given content, the target server may or may not be capable of serving that content for display in the proper format. If it does not, the target server retrieves a plug-in code module from a publishing server, installs the module, and then uses the module to process the content into the desired format. The resulting data is then served back to the requesting client and is displayed at the client in the appropriate proprietary format.

In an alternate embodiment, the code module is uploaded from the client itself as opposed to being served from a publishing server.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
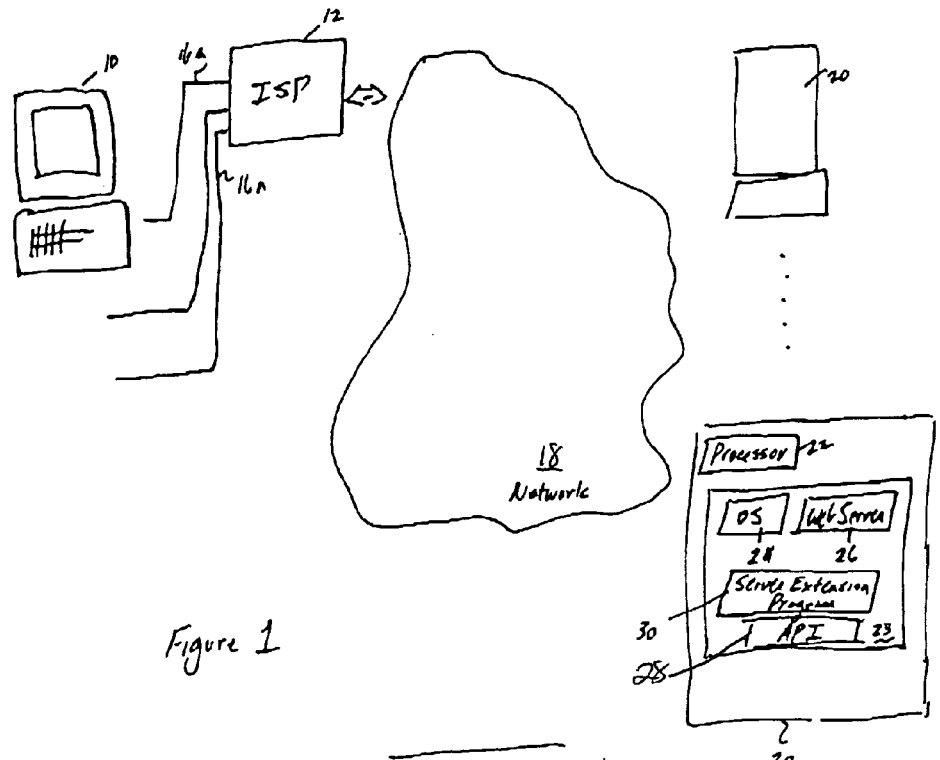
FIG. 1 is a representative system in which the present invention is implemented.

A representative system in which the present invention is implemented is illustrated in FIG. 1. A plurality of Internet client machines 10 are connectable to a computer network Internet Service Provider (ISP) 12 via a network such as a dialup telephone network. As is well known, the dialup telephone network usually has a given, limited number of connections 16a–16n. ISP 12 interfaces the client machines 10 to the remainder of the network 18, which includes a plurality of web content server machines 20. Network 18 typically includes other servers (not shown) for control of domain name resolution, routing and other control functions. A client machine typically includes a suite of known Internet tools, including a Web browser, to access the servers of the network and thus obtain certain services. These services include one-to-one messaging (e-mail), one-to-many messaging (bulletin board), on-line chat, file transfer and browsing. Various known Internet protocols are used for these services. Thus, for example, browsing is effected using the Hypertext Transfer Protocol (HTTP), which provides users access to multimedia files using Hypertext Markup Language (HTML). The collection of servers that use HTTP comprise the World Wide Web, which is the Internet's multimedia information retrieval system.

A given client machine and the server may communicate over the public Internet, an intranet, or any other computer network. If desired, given communications may take place over a secure connection. Thus, for example, a client may communication with the server using a network security protocol, such as Netscape's Secure Socket Layer (SSL) protocol.

A representative client is a personal computer, notebook computer, Internet appliance or pervasive computing device (e.g., a PDA or palm computer) that is x86-, PowerPC®- or RISC-based. The client includes an operating system such as Microsoft Windows, Microsoft Windows CE or PalmOS. As noted above, the client includes a suite of Internet tools including a Web browser, such as Netscape Navigator or Microsoft Internet Explorer, that has a Java Virtual Machine (JVM) and support for application plug-ins or helper applications.

A representative pervasive client is x86-, PowerPC® or RISC-based, that includes a realtime operating system such as WindRiver VXWorks™, QSSL QNXNeutrino™, or Microsoft Windows CE, and includes a graphics viewer such as a Web browser. An illustrative pervasive computer client may render documents in a markup language such as the Handheld Markup Language (HDML). In addition, a given pervasive computing client may use a proprietary image display format. Thus, before an image may be displayed on the device, the image content (e.g., a .gif, .jpeg, .png, or the like file) supported on a given web server may need to be converted to the proprietary format. According to the present invention, a code module may be used for this purpose as will be seen.

A representative web server is an IBM Netfinity server comprising a RISC-based processor 22, a UNIX-based operating system 24 and a web server program 26. OS 24 and web server program 26 are supported in system memory 23 (e.g., RAM). The server may include an application programming interface 28 (API) that provides extensions to enable application developers to extend and/or customize the core functionality thereof through software programs including plug-ins, CGI programs, servlets, and the like.

Figure 2:
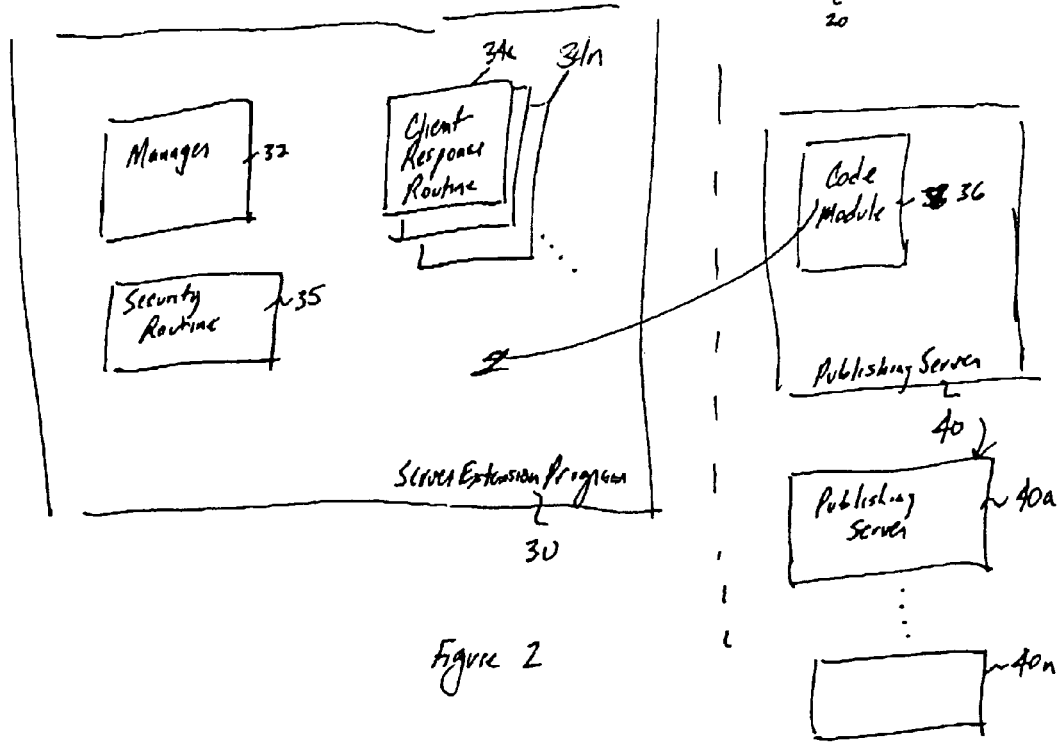
FIG. 2 illustrates the preferred components of the present invention.

FIG. 2 illustrates one such control program 30 that provides the functionality of the present invention. This program is referred to as a server extension program as it enables the web server to provide additional functionality on an "as-needed" basis. According to the present invention, the server extension program is supported in system memory of a target server and is executed by a processor. For illustrative purposes, the server extension program 30 is implemented as a Java servlet and includes a number of components: a manager 32 for controlling the overall function of the program and for generating one or more instances of a client response routine 34a–n. An instance of the client response routine may be spawned when a client request is received at the server. The client response routine provides the basic functionality of the invention. As will be seen, this routine determines whether the client request requires a code module, designated by reference numeral 36, that is not available at the target server for a given reason. One reason the code module is not available at the target server may be that the module is not hosted on the server. Another reason is that the code module 36 is supported but is not currently available for use by the target server. The server extension program 30 may optionally include a security routine 35 for verifying the authenticity of a given code module 36 served from a publishing server 40 before that module may be installed and/or used at the target server. As will be described below, the security routine 35 may implement any well-known security routine, such as a public key cryptosystem.

According to the present invention, a "code module" comprises a set of instructions (and perhaps associated data) that provide at least one logical function or operation to the server that receives that module.

One or more publishing servers 40a–n are provided throughout the computer network to host the code modules. In the preferred embodiment, code modules are written to a given transformation API so that application developers can write modules that perform given functions at any arbitrary server. As will be described below, in an alternative embodiment, a given code module may be supported on a client that makes a request for service to the target server. Thus, if necessary or desirable, a given client machine may upload a code module to the target server for use by one of client response routines 34a–34n. While not meant to be limiting, a given code module may be written in Java or in a native code format (e.g., C, C++, or the like).

Figure 3:
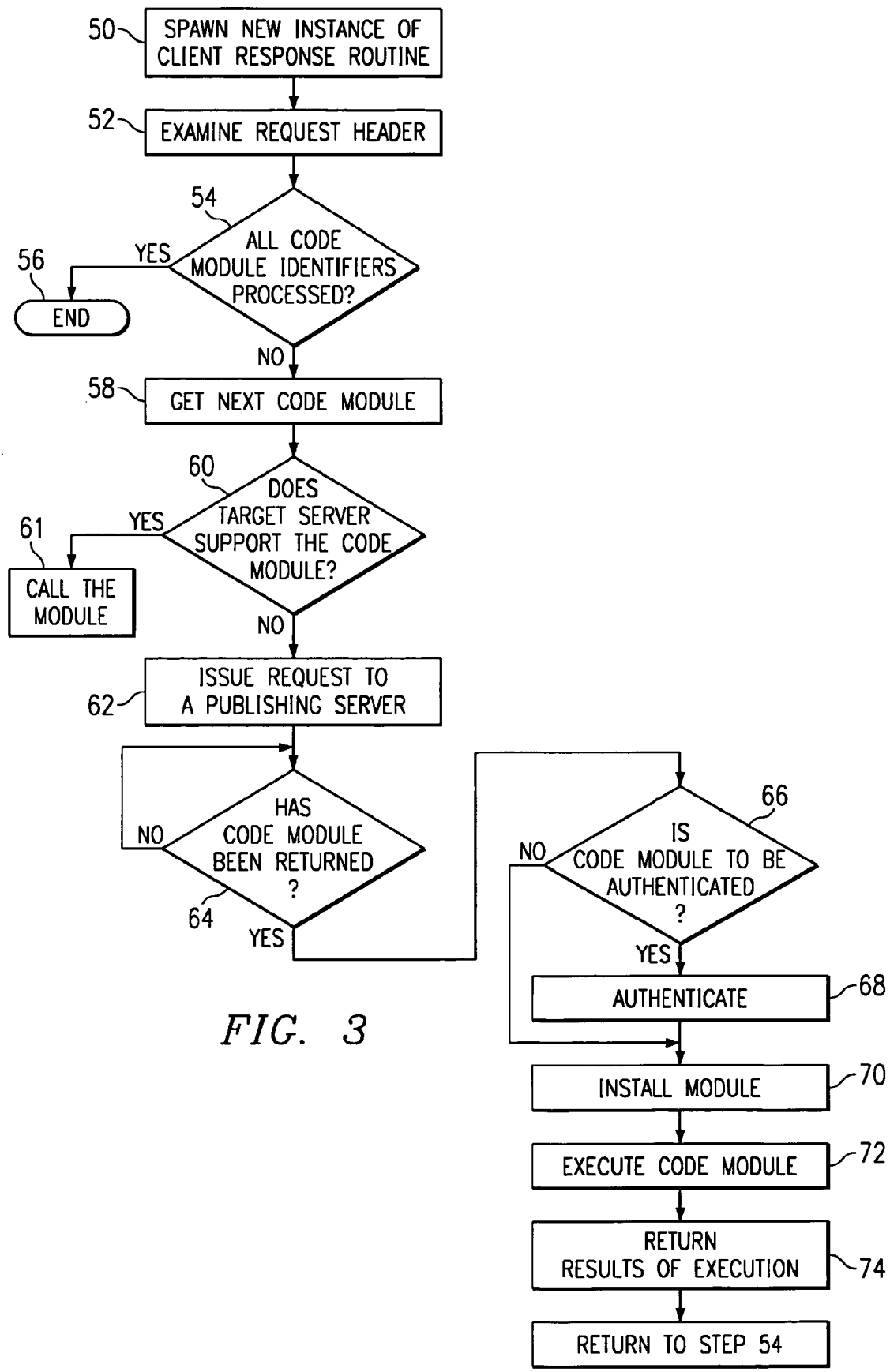
FIG. 3 is a flowchart illustrating a preferred operating routine of the present invention wherein a given code module required to service a client request is retrieved to a target server from a publishing server.

FIG. 3 is a flowchart of a preferred operation of a client response routine of the present invention. As noted above, a given instance of the client response routine may be spawned upon receipt of a given client request. The routine begins when the new instance of the routine is spawned at step 50. At step 52, the client request routine examines a request header of the client request. As will be described below, when the client request is generated at the client, the request header may include one or more code module identifiers. Each identifier has an associated URL identifying a location in the computer network from which the code module may be retrieved if necessary. At step 54, the client request routine tests to determine whether all code module identifiers have been processed. If so, the routine branches to step 56 and terminates. If all code modules have not been processed, the routine continues at step 58 to get the next code module identifier in the request header. The routine then continues at step 60 to test whether the target server has the code module identified by the code module identifier. If so, the routine continues at step 61 and calls that module for execution. If the outcome of the test at step 60 indicates that the target server does not have the code module, the routine continues at step 62. At step 62 the routine issues a request for the code module to a publishing server. The publishing server (and the location thereof) are preferably identified by the URL passed to the target server with the code module identifier. Alternatively, a lookup procedure may be used.

At step 64, a test is made to determine whether the code module has been returned from the publishing server. If not, the routine cycles. When a response is received from the publishing server, the client response routine then continues at step 66 to test whether the retrieved code module is to be authenticated. If the outcome of the test at step 66 is positive, the code module is authenticated at step 68. The routine then continues at step 70, which step is also reached by a negative outcome of the test at step 66. At step 70, the code module is installed at the target server. The code module is then executed at step 72. The results of the code module execution are then returned at step 74. Control then returns to step 54 to complete the processing.

Thus, in accordance with a preferred embodiment of the invention, the server extension program spawns an instance of the client response routine whenever a given client request having a code module identifier (and associated URL) is received at the target server. If the code module is not then available at the target server, the client response routine issues a request for the module from an appropriate publishing server. Upon receipt of the code module, the module is installed and executed. Thus, the target server's functionality is extended on an as-needed basis to facilitate providing the response (from the target server) to the originating client.

Figure 4:
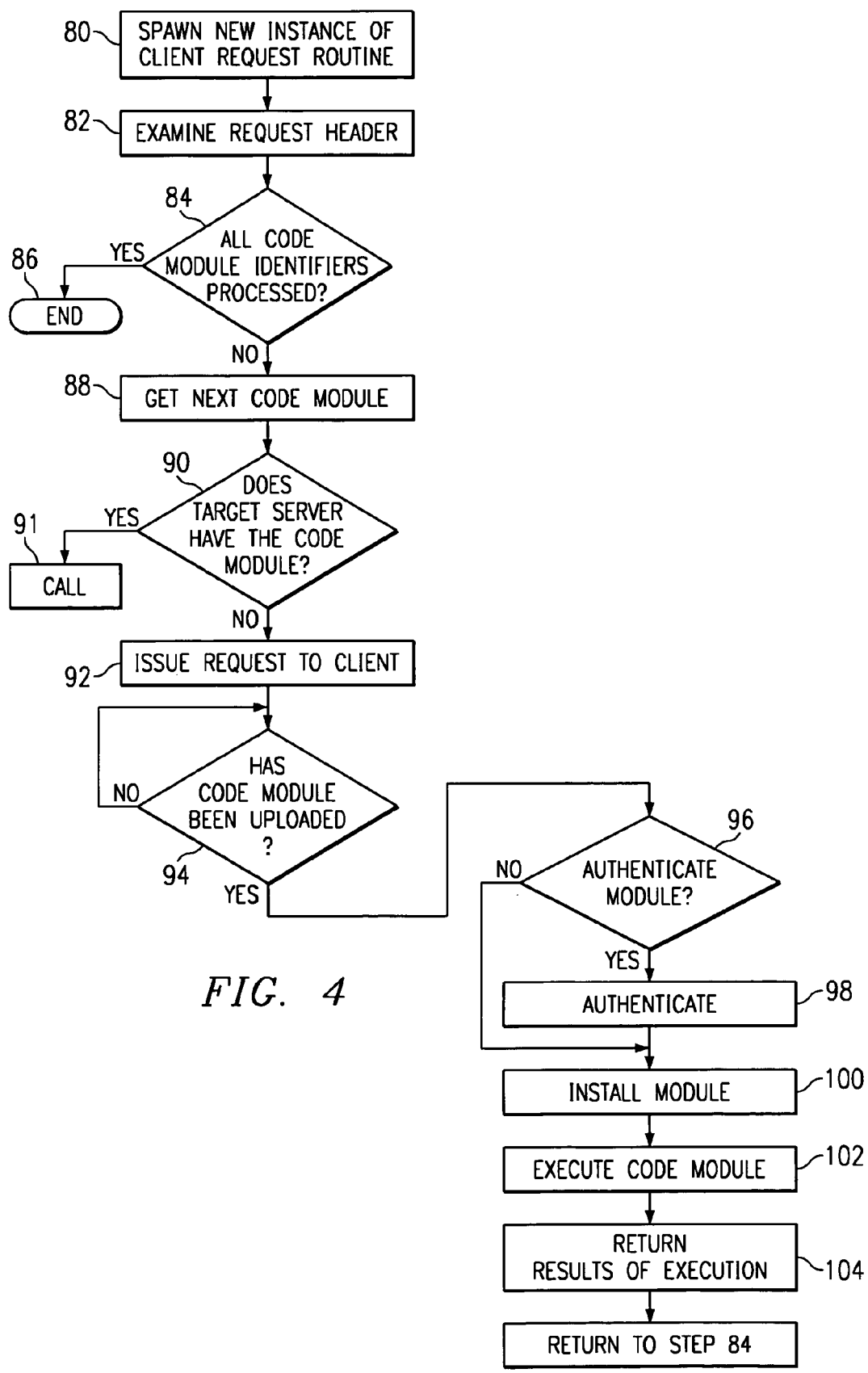
FIG. 4 is a flowchart illustrating an alternative embodiment of the present invention wherein a given code module required to service a client request is uploaded from the client.

FIG. 4 is a flowchart illustrating an alternative embodiment of the client request routine of the present invention wherein a given code module required to service a client request is uploaded from the client itself. The routine begins at step 80 when a new instance of the routine is spawned. At step 82, the client request routine examines a request header of the client request. At step 84, the client request routine tests to determine whether all code module identifiers have been processed. If so, the routine branches to step 86 and terminates. If all code modules have not been processed, the routine continues at step 88 to get the next code module identifier in the request header. The routine then continues at step 90 to test whether the target server already has the code module identified by the code module identifier. If so, the routine branches to step 91. If the outcome of the test at step 90 indicates that the target server does not have the code module, the routine branches to step 92. At step 92 the routine issues a request for the code module to the requesting client.

At step 94, a test is made to determine whether the code module has been uploaded from the client machine. If not, the routine cycles. When a response is received from the client machine, the client response routine then continues at step 96 to test whether the retrieved code module is to be authenticated. If the outcome of the test at step 96 is positive, the code module is authenticated at step 98. The routine then continues at step 100, which step is also reached by a negative outcome of the test at step 96. At step 100, the code module is installed at the target server. The code module is then executed at step 102. The results of the code module execution are then returned at step 104. Control then returns to step 84 to complete the processing.

As can be seen, the code module preferably is not served with the original client request. This is desirable because the requesting client may not know (when it issues the initial client request) whether the target server in fact already supports the code module. If the code module does not need to be uploaded, network resources are conserved. If bandwidth is not a significant constraint, however, the code module may be uploaded to the target server without first evaluating whether or not the target server already supports the module. The process steps of FIG. 4 are then adjusted accordingly.

In an alternate embodiment, given code modules are registered at a given server in an off-line registration process. This is desirable when new devices are brought into the network, since it is unlikely that an existing server may have seen the device previously. In addition, a registration process is useful where code modules are continuously updated, improved or enhanced. For example, when a given code module is upgraded to a new version, it may be desirable for that module to be registered with a given server that already has the earlier version.

Figure 5:
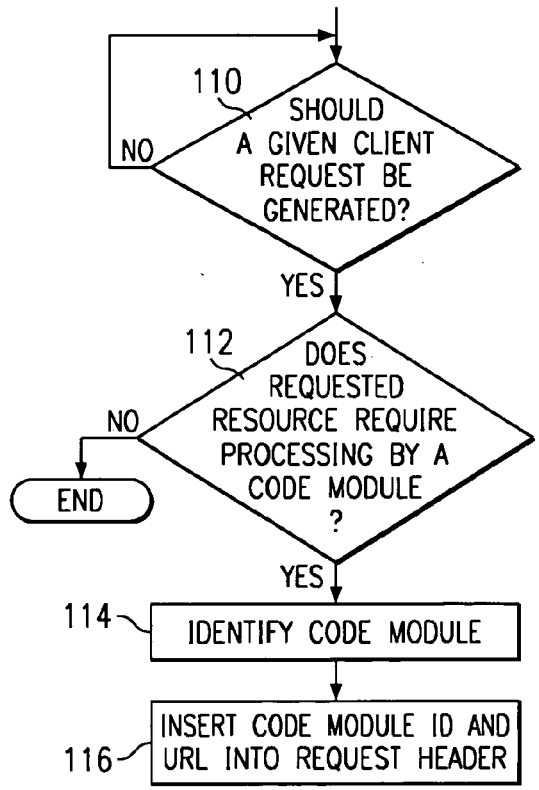
FIG. 5 is a flowchart illustrating a routine operative at a client for inserting a code module identifier and URL into a client request header.

In both embodiments, the requesting client preferably identifies the code module (by its identifier) and, optionally, its location in the computer network (i.e. via the URL). In a preferred embodiment, that functionality is provided by the routine illustrated in the flowchart of FIG. 5. This routine may be implemented in any convenient fashion on the client, e.g., a browser plug-in, a Java applet, a Javascript, an ActiveX control, code implemented within the browser itself, or by a standalone program. The routine begins at step 110 by determining whether a given client request is to be generated and issued to a target server. If not, the routine cycles. If a client request is to be generated, the routine continues at step 112 to test whether the requested resource requires processing by a code module. If not, the routine terminates. If, however, the requested resource requires processing by a code module, the routine continues at step 114 to identify the code module. At step 116, a code module identifier and the code module URL are inserted into the client request header. This completes the processing.

Figure 6:
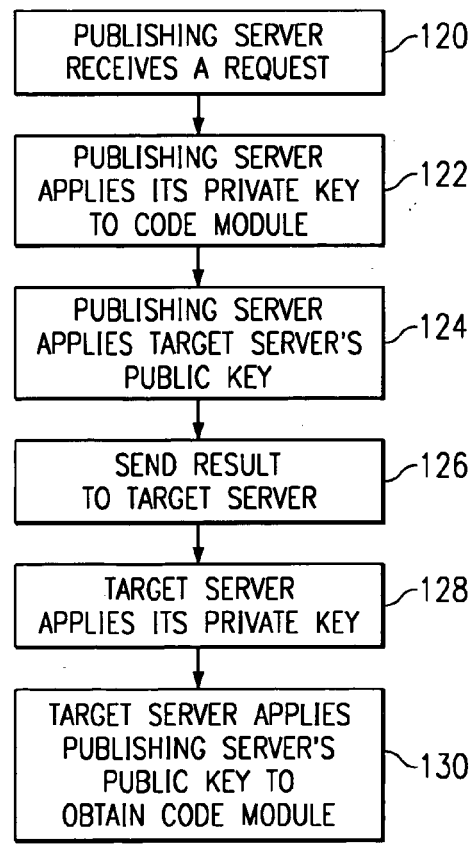
FIG. 6 is a flowchart of a code module security routine operative at a publishing server for use in generating a secure version of a given code module.

One of ordinary skill in the art will appreciate that the code module deployment scheme described above may be used for malicious purposes. Thus, in a preferred embodiment, the code modules are provided to the target server in a secure manner. FIG. 6 illustrates a code module security routine that may be used for this purpose. The code module security routine executes on a given publishing server. In a preferred embodiment, the publishing server and a given target server (via the security routine 35) secure code modules using a public key cryptosystem, such as PGP. As is well-known, a public key cryptosystem enables a pair of parties, each of whom have a public key and a private key "pair", to send and receive messages in a secure fashion. In particular, the sender can verify that only the recipient (and not some third party) gets the message, and the recipient can verify that the sender was the only party who could have sent the message.

The routine begins at step 120 when the publishing server receives a request from the target server for a given code module. At step 122, the publishing server's applies its private key to the code module. At step 124, the publishing server applies the target server's public key to the result of step 122. The resulting data is then sent to the target server at step 126. At step 128, the target server applies its private key to the received data. Thereafter, at step 130, the target server decrypts the result by applying the publishing server's public key to obtain the code module in the clear. The code module may then be installed and executed in the target server native operating environment.

The above-described encryption scheme is not limiting. Any convenient technique may be used in the alternative. Thus, for example, the publishing server may simply sign the module with a private key and serve the signed module to the target server. The target server would then use a public key associated with the publishing server's private key to verify authenticity of the code module prior to installing and running the module. Of course, if the publishing and target servers communicate over a secure connection (e.g., SSL or HTTPS), the separate encryption steps are not required. Another approach would be to merely perform a checksum operation on the code module for authentication purposes. Moreover, if desired, the code modules may be served without any additional security.

Although not required, a target server preferably caches or permanently stores code modules for reuse in servicing other client requests. Periodically, code modules may be flushed from the server's memory or permanent storage. Thus, for example, a given code module may be deleted from memory if it has not been used within a given timeout period. This operation ensures that the server's memory or permanent storage do not get filled up with code modules that are only used once or infrequently.

The present invention provides numerous advantages. Foremost, the invention enables an arbitrary web server to perform functions or processing that are not part of the server's native tool set. Using the present invention, a web server may respond to a given client request irrespective of whether the server recognizes the client. In this way, the server need not be configured initially to process requests from all types of devices. The inventive technique is especially useful for interfacing pervasive computing devices to arbitrary web servers as such devices may not be easily recognized by a conventional web server. In addition, because code modules are preferably written to conform to a given API, application may write code modules that perform given functions. Any code module that conforms to the transformation API will then be useful in extending the capabilities of the web server irrespective of whether the server fully understands the behavior of the module.

The transformation API is typically platform-dependent. A representative API, however, may be defined and implemented with Java bean architecture using a Java Application Server such as IBM WebSphere. The Java bean is a convenient embodiment of an API as it enables a process to discover properties and then return such information to the application server.

In an illustrative example of the present invention, the client is a pervasive device having a proprietary image display format. When the pervasive client makes a request for given content, it is assumed that the target server is not capable of serving that content for display in the proper format. According to the invention, the target server retrieves a plug-in code module from a publishing server, installs the module, and then uses the module to process the content into the desired format. The resulting data is then served back to the pervasive client and is displayed in the appropriate proprietary format. The above example, however, is merely representative.

As noted above, the inventive mechanism is preferably implemented in or as an adjunct to a target web server. Although not meant to be limiting, the above-described functionality is preferably implemented as standalone native code or, alternatively, as a Java servlet or application. As noted above, code modules may be written in Java or in the server's native code. Generalizing, the above-described functionality is implemented in software executable in a processor, namely, as a set of instructions (program code) in a code module resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Further, as used herein, a Web "client" should be broadly construed to mean any computer or component thereof directly or indirectly connected or connectable in any known or later-developed manner to a computer network, such as the Internet. The term "Web server" should also be broadly construed to mean a computer, computer platform, an adjunct to a computer or platform, or any component thereof. Of course, a "client" should be broadly construed to mean one who requests or gets the file, and "server" is the entity which downloads the file.

Having thus described our invention, what we claim as new and desire to secure by Letters Patent is set forth in the following claims.

What is claimed is:

1. A method for enabling a web client to add functionality to a web server on an as-needed basis, comprising the steps of:

receiving a request from a client, the request identifying a code module required to process the request;

responsive to a determination that the code module is not available at the web server, uploading a code module from the client to the web server, wherein the code module is signed with a key at the client;

verifying authenticity of the signed code module; and at the web server, using the uploaded code module as needed to service a given request from the web client.

2. The method as described in claim 1 wherein the web client is a pervasive computing client.

3. The method as described in claim 2 wherein the code module translates data into a given proprietary format and serves the translated data back to the pervasive computing client.

4. The method as described in claim 1 wherein the code module conforms to a given application programming interface (API).

5. A computer program product in a computer usable medium operative in a web server, comprising:

means for receiving a request from a client, the request identifying a code module required to process the request;

means responsive to a determination that the code module is not available at the web server for requesting the client to upload the code module, wherein the code module is signed with a key at the client;

means responsive to receipt of the code module from the client for verifying authenticity of the signed code module; and means for installing the code module at the web server for use in responding to the request.

6. The computer program product as described in claim 5 wherein the code module conforms to a given application programming interface.

7. The computer program product as described in claim 5 further including means for executing the code module to respond to the request.

* * * * *